United States Patent [19]

Stephens

[11] Patent Number: 5,025,403

[45] Date of Patent: Jun. 18, 1991

[54] FRACTION ENTRY AND DISPLAY

[75] Inventor: Bruce A. Stephens, Corvallis, Oreg.

[73] Assignee: Hewlett-Packard Company, Palo Alto, Calif.

[21] Appl. No.: 429,437

[22] Filed: Oct. 30, 1989

[51] Int. Cl.$^5$ .............................................. G06F 3/02
[52] U.S. Cl. .............................................. 364/709.07
[58] Field of Search ............... 364/709.07, 710.06, 364/710.09; 235/145 R

[56] References Cited

U.S. PATENT DOCUMENTS

| | | | |
|---|---|---|---|
| 4,064,398 | 12/1977 | Kishimoto et al. | 364/709.07 |
| 4,081,859 | 3/1978 | Goldsamt et al. | 364/709.07 |
| 4,118,783 | 10/1978 | Collins | 364/734 |
| 4,121,760 | 10/1978 | Cochran et al. | 364/700 X |
| 4,475,165 | 10/1984 | Rizk et al. | 364/709.16 |
| 4,488,250 | 12/1984 | Lipsey et al. | 364/709.07 |
| 4,545,022 | 10/1985 | Hughins | 364/709.07 |
| 4,744,044 | 5/1988 | Stover et al. | 364/737 |
| 4,800,514 | 1/1989 | Earle | 364/715.07 |

FOREIGN PATENT DOCUMENTS 52-38857 3/1977 Japan .............................. 364/709.07

OTHER PUBLICATIONS

Marion et al., "Wrist Instrument Opens New Dimension in Personal Information", Hewlett-Packard, Journal, Dec. 1977, pp. 2-10.

Primary Examiner—Dale M. Shaw
Assistant Examiner—Tan V. Mai

[57] ABSTRACT

A calculator receives fraction values directly, without requiring the user to perform mathematic operations, by use of a primary key to separate digits of the whole number, numerator and denominator. The calculator also displays fractions with a user specified denominator allowing convenient application to user needs. By reducing mental effort in entering numeric values and interpreting results of calculations, the calculator is better adapted to suit a particular user's needs.

10 Claims, 6 Drawing Sheets

FRACTION ENTRY AND DISPLAY

FIELD OF THE INVENTION

The present invention relates to electronic calculators, and more particularly, relates to a technique for entering and displaying fraction values in such a calculator.

BACKGROUND OF THE INVENTION

Use of a calculator should be convenient and adaptable to a user's needs. Because a calculator may be used many times in a day, great improvements in convenience are achieved by reducing mental effort required to enter numeric values or evaluate values displayed as output. More particularly, because values input to a calculator come from the user's needs and values output from the calculator must be applied to the user's needs, a calculator having data entry and data output corresponding to the user's needs is desirable.

Most calculators receive as input and display as output decimal numeric values where a decimal point separates a whole integer portion and a partial integer portion. For example, a value represented as "1.7" includes a whole integer portion "1" and a partial integer portion "7", representing a ratio of the values seven and ten. There exists, however, a need to manipulate fractions on calculators. Accordingly, there exists a need for convenient entry and display of such fractions on calculators.

A conventional method of entering numeric values represented as fractions is indirect. Such method requires mathematic operations and some degree of mental effort by the user. For example, to enter the fraction "3 and ⅝" the user, through a series of calculator operations, divides the value five by the value eight and adds the value three. On reverse polish machines, the user enters the values three, five and eight and executes the functions divide and add. However, this method requires three stack registers and mental effort in performing the mathematic operations of division and addition. It is, therefore, desirable that a calculator receive fraction values directly without mathematic operations to save register use and to reduce mental effort which may distract the user.

In a conventional method of displaying fractions on calculators, a given level of decimal precision is first established. The calculator then provides a fraction display having a whole number, numerator, and denominator based on the established level of precision. However, the denominator selected by the calculator is not likely to be directly applicable to the user's needs because the user is normally familiar with fraction values expressed with certain denominators. The output display then requires interpretation or conversion by additional mathematic operations for the user to appreciate its significance.

OBJECTS AND ADVANTAGES OF THE INVENTION

It is an object of the present invention to provide a calculator having input and output capability corresponding to the user's needs.

It is an object of the present invention to provide a calculator which accepts directly fraction values as input. The user need not divide a numerator by a denominator and add a whole number to enter a fraction value.

It is an object of the present invention to provide a calculator showing fractions with user selectable denominators. The user is then presented with calculator output matching his or her needs.

SUMMARY OF THE INVENTION

The foregoing objects and advantages are achieved by a calculator that includes a "primary" key used to separate fields of data, e.g., whole number, numerator and denominator, as they are entered by a user. A first sequence of digits preceding a first activation of the primary key corresponds to a first data field, such as the whole number portion. A second sequence of digits following the first activation of the primary key but preceding a second activation of the primary key corresponds to a second data field, such as the numerator number portion. A third sequence of digits following the second activation of the primary key corresponds to a third data field, such as the denominator number portion. Additional data fields are entered in similar fashion.

In one application of the present invention, the above noted primary key is the decimal point key and processing of digit entry keys is interpreted as entry of a decimal value up to the second activation of the decimal point key whereupon subsequent digit keys are interpreted as denominator digits. In this manner, a primary key, the decimal point key, is used at a time when it would be otherwise de-activated to provide a convenient method of direct fraction entry.

The calculator may be further provided with a fraction display mode wherein the user specifies an arbitrary denominator value for use in displaying calculation results as a fraction. When in fraction display mode, the calculator displays numeric values as a whole number and a fraction with the user specified denominator such that the user may view calculation results in a familiar form.

The subject matter of the present invention is particularly pointed out and distinctly claimed in the concluding portion of this specification. Both the organization and method of operation of the invention, together with further advantages and objects thereof, however, may best be understood by reference to the following description and accompanying drawings wherein like reference characters refer to like elements.

DETAILED DESCRIPTION OF THE INVENTION

Figure 1:
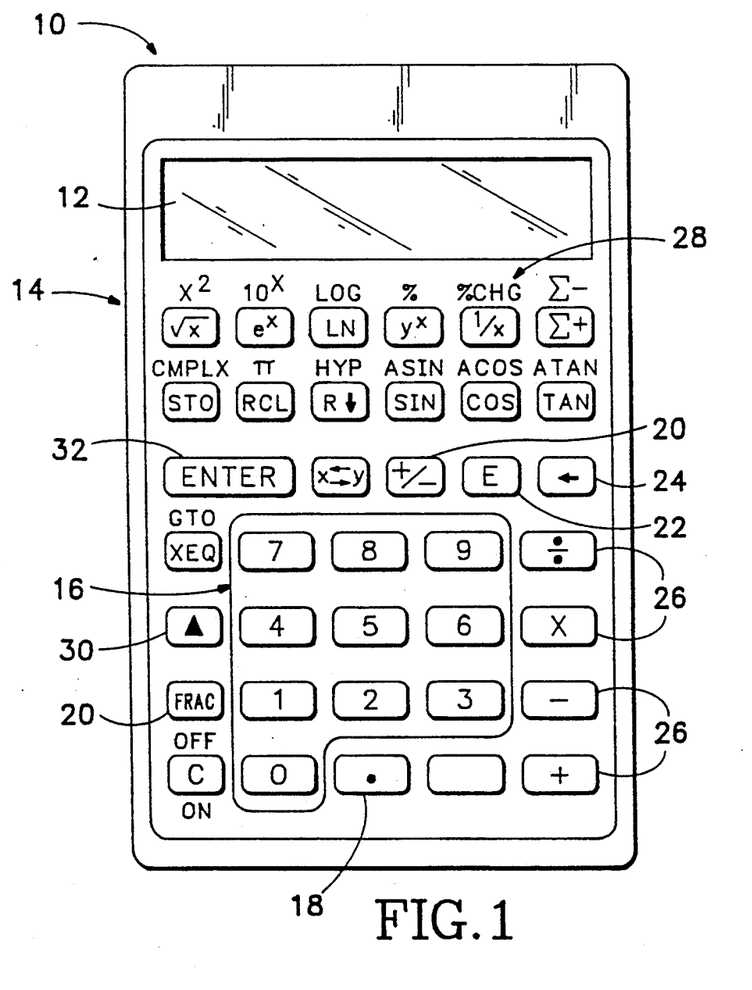
FIG. 1 illustrates a hand-held calculator.

FIG. 1 illustrates a hand-held calculator 10 including a display panel 12 and a keyboard 14. An operator of calculator 10 enters numeric values and executes mathematic functions by way keyboard 14. Numeric values entered and the results of mathematic functions generated are presented on display panel 12.

The keys of keyboard 14 may be generally divided into two sets, "digit entry keys" associated with the entry of numeric values into calculator 10 and "function keys" associated with the execution of mathematic operations regarding such numeric values. The digit entry keys include digit keys 16, numbered zero through nine, the decimal key 18, the change sign key 20, the exponent key 22 and the backspace key 24. The function keys of keyboard 14 include the divide, multiply, subtract and add keys 26. A second set of function keys 28 initiate a variety of mathematic functions commonly found on hand-held calculators such as, for example, sine, cosine, tangent, log, summation and inversion. Another function key of calculator 10 is the shift key 30 and is used to invoke alternate operations associated with function keys 28. While not specifically shown in FIG. 1, all keys of keyboard 14 may be provided with alternate functions that may be invoked by operation of shift key 30. Yet another function key of calculator 10 is the enter key 32.

As used herein and in the appended claims, the term "primary key" refers to a calculator key not activated in conjunction with other calculator keys. For example, a primary key is a key invoked without use of shift key 30. To select or activate a primary key, the key is simply pressed. In this capacity, the key is a primary key. An alternate use of the same key invoked by operation of the shift key 30 distinguishes a primary key from a "shifted key". In this capacity the key is not a primary key because it is used in conjunction the shift key 30. It may be appreciated that a primary key is more convenient to use than a shifted key since the user need not invoke shift key 30. It may be further appreciated that, in light of the multitude of functions implemented on most calculators, primary keys are at a premium. It will be further appreciated that any operation implemented by way of primary keys is desirable in that user effort is minimized.

A user of calculator 10 develops numeric values as input by operation of the digit entry keys. Each numeric value so developed may be placed in input registers, organized as a stack, by operation of enter key 32. After entry of one or more values into calculator 10, the user may invoke selected mathematic operations, in accordance with conventional reverse polish notation, by operation of the function keys.

Thus, programming of calculator 10 requires a digit entry mode where the user develops a satisfactory numeric value by operation of the digit entry keys and other modes wherein calculator 10 performs selected operations.

Figure 2:
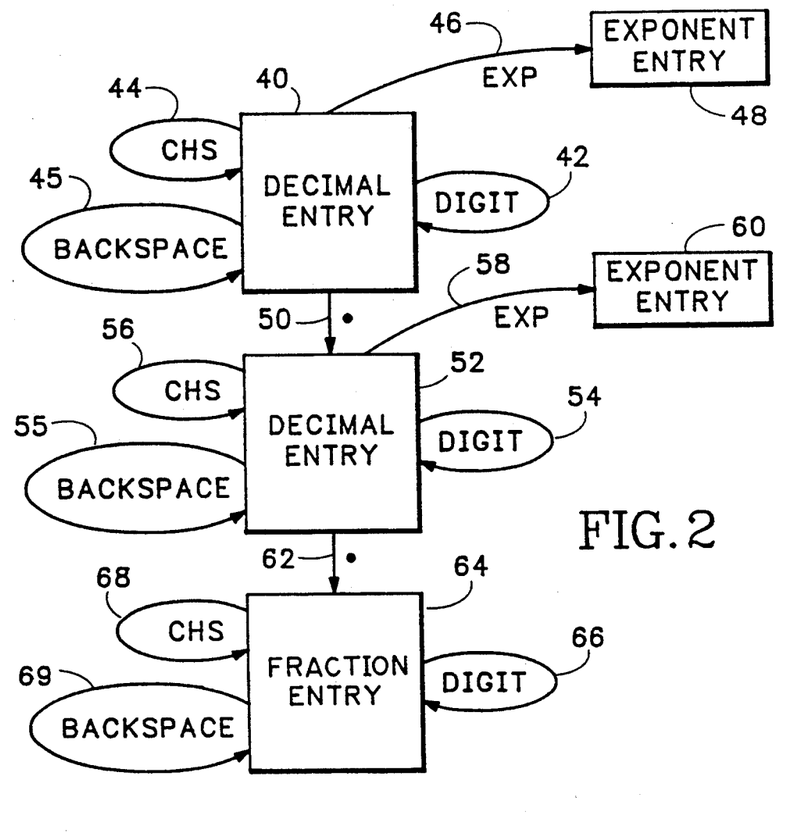
FIG. 2 illustrates processing states associated with a digit entry mode of a calculator according to the present invention.

FIG. 2 is a digit entry mode state diagram according to the present invention for the calculator of FIG. 1. The states shown in FIG. 2 correspond to processing states encountered while receiving digit input to fill an input register 36, shown in FIG. 3. Once in digit entry mode, processing is driven by user input and by a digit entry state register 38, shown in FIG. 4. As the user activates digit entry keys, calculator 10 references state register 38 to interpret digit entry key activation, maintain an appropriate numeric value in input register 36, and display a corresponding character sequence on panel 12.

Figure 3:
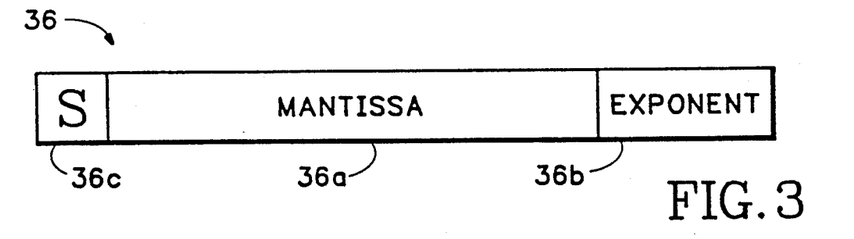
FIG. 3 is an input register updated during the digit entry mode states shown in FIG. 2.

Thus, calculator 10 updates input register 36 upon activation of each digit entry key. When the user activates a function key to select an operation, such as multiply or divide, calculator 10 exits digit entry mode and takes the current value of input register 36 as an argument to the selected operation.

In FIG. 3, input register 36 includes a mantissa field 36a holding a twelve digit mantissa in binary coded decimal (BCD) format and an exponent field 36b holding a three digit exponent in BCD format. Register 36 also includes a sign bit 36c. When calculator 10 enters digit entry mode, field 36a is initialized to hold the value zero, field 36b is initialized to hold the value zero, and field 36c is set to indicate a default sign, e.g., a positive sign. Then, as the user activates the digit entry keys, calculator 10 updates fields 36a, 36b and 36c in accordance with user input.

Figure 4:
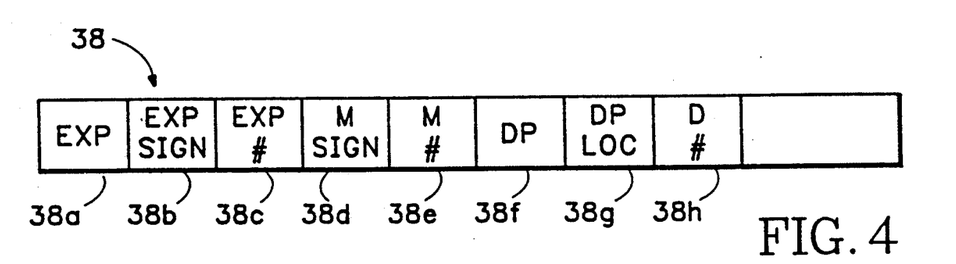
FIG. 4 illustrates a state register used to interpret user input during the digit entry mode states shown in FIG. 2.

In FIG. 4, state register 38 assists in interpreting activation of digit entry keys and, more particularly, in how input register 36 is updated following activation of each digit entry key. State register 38 includes an exponent field 38a indicating exponent entry in progress, an exponent sign field 38b representing the sign of the exponent, exponent digits field 38c representing the number of exponent digits entered, a mantissa sign field 38d indicating the sign of the mantissa stored in register 36, mantissa digits field 38e representing the number of mantissa digits entered, a decimal point field 38f indicating entry of a decimal point, and a decimal point location field 38g indicating a decimal the mantissa. A denominator digits field 38h stores the number of digits entered into a denominator register, described below.

With reference to FIGS. 1-4, calculator 10 enters decimal entry state 40 of digit entry mode when the user first presses a digit entry key, i.e., when the user begins entry of a numeric value. One exception is the change sign key 20 which does not start digit entry mode because it can be used to change the sign of any number currently displayed. Registers 36 and 38 are suitably initialized. The first digit entry key stroke is then processed. Loop path 42 is followed when the user enters a digit by operation of one of keys 16. Loop path 44 is followed when the user presses the change sign key 20. Loop path 45 corresponds to activation of the backspace key 24. Each of loop paths 42, 44 and 45 correspond to procedures associated with processing of keys 16, 20 and 24, respectively. Path 46 is taken to exponent entry state 48 when the user presses the exponent key 22. State block 48 corresponds to procedures for entry of exponent digits, including procedures responsive to user activation of digit keys 16, back space key 24 and change sign key 20. Finally, first decimal point path 50 is taken when the user enters the decimal point key 18 a first time. In each case, calculator 10 first determines the key pressed and references state register 38 in order to properly update input register 36.

For example, if the first entry is the number five digit key 16, calculator 10 places a BCD representation of the value five in the first portion of the mantissa field 36a of register 36 and increments by one field 38e of state register 38 to indicate an additional mantissa digit. If the user then presses the change sign key 20, calculator 10 responds by toggling field 38d of state register 38 and field 36c of register 36 to represent the opposite sign for the mantissa. If the backspace key 24 is pressed, calculator 10 decrements by one field 38e to one field 38e to indicate one less digit in the mantissa field 36a of register 36 and clears to zero the corresponding digit in field 36a. If the user presses the exponent key 22, calculator 10 sets to one field 38a of state register 38 to indicate that subsequent digit entries should be placed in the exponent field 36b of input register 36.

It may be appreciated that, through suitable programming of calculator 10, state register 38 may be employed to properly interpret user activation of digit entry keys and update both state register 38 and input register 36 in order to develop an input value desired by the user.

Upon activation of decimal point key 18 a first time, processing follows first decimal path 50 to decimal entry state 52 which is similar to state 40. Upon transition from state 40 to state 52, field 38f of state register 38 is set to one to indicate that the decimal point key has been activated, and field 38g of state register 38 is assigned a value equal to the current value of field 38e indicating the position within the mantissa at which the decimal is to be located. Once in state 52, processing of user input is similar to that of state 40. State 52 includes a loop path 54 corresponding to activation of digit keys 16, a loop path 55 for activation of backspace key 24, a loop path 56 for the change sign key 20, and a path 58 from state 52 into an exponent entry state 60 corresponding to activation of the exponent key 22.

Heretofore, path 50 could be a loop path back into state 40 whereby entry of the decimal point key would cause calculator 10 to update fields 38f and 38g of state register 38 and subsequent entry of the decimal point key 18 would have no affect on processing. In other words, heretofore, once the decimal point key 18 was pressed a first time, key 18 would be dead unless backspace key 24 was activated to delete the decimal point or, until calculator 10 again entered digit entry mode.

In accordance with the present invention, however, pressing decimal point key 18 a second time causes processing to branch along path 62 from state 52 to fraction entry state 64. In state 64, calculator 10 continues to process some, but not all digit entry keys. Loop path 66 corresponds to activation of digit keys 16, loop path 68 corresponds to activation of the change sign key 20, and loop path 69 corresponds to activation of the backspace key 24. It may be noted that once calculator 10 enters state 64, exponent entry is no longer possible and no path is provided from state 64 to an exponent entry state.

Thus, FIG. 2 illustrates generally a digit entry mode for a calculator in accordance with the present invention. A user begins inputting a numeric value into calculator 10 in state 40 and may exit state 40 to exponent entry state 48 by way of path 46. If, in state 40, the user activates the decimal key 18, the user so specifies the placement of a decimal point in the numeric value being entered. This causes processing to enter state 52 where the user may provide additional input to specify the partial integer portion of the numeric value being input, or may enter exponent entry state 60 along path 58 by activation of the exponent key 22. To this point, activation of the digit entry keys is interpreted as a decimal value.

The user easily specifies a fraction value as input by activating the decimal point key 18 a second time. In this manner, a fraction value is entered directly by way of the digit entry keys and twice activating a primary key. More particularly, the user specifies the whole portion of a fraction value while in state 40, the numerator portion of a fraction integer value while in state 52, and the denominator portion of a fraction value while in state 64.

For example, to specify the fraction value "3 and ⅝", the user activates the number three digit key 16, the decimal point key 18, the number five digit key 16, the decimal point key 18, and the number eight digit key 16. It may be appreciated that this procedure is much more convenient than the awkward and distracting method of first dividing the value five by the value eight and adding the value three. This procedure also uses a primary key, the decimal point key 18, which would be otherwise inactive or dead after its first activation. It may be further appreciated that the above-described method of fraction entry directly corresponds to the actual representation of the value with which the user is familiar.

Figure 5:
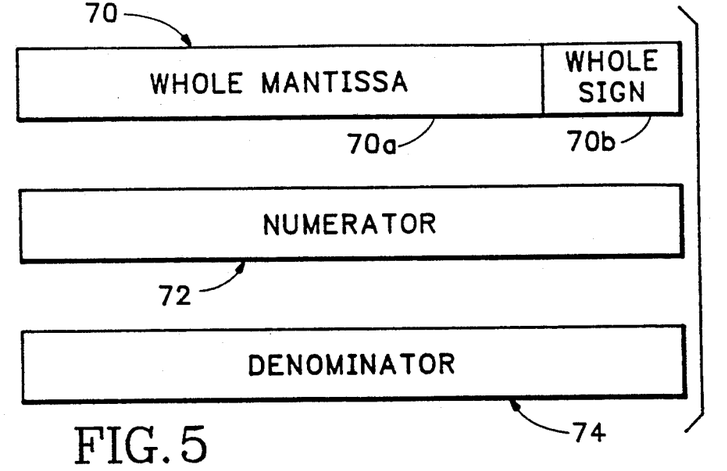
FIG. 5 illustrates memory registers used to hold portions of a fraction value.

Once calculator 10 enters state 64, it maintains three values: a whole number corresponding to digits entered prior to the first decimal point, a numerator corresponding to digits entered subsequent to the first decimal point but prior to the second decimal point, and a denominator corresponding to digits entered after the second decimal point. Calculator 10 stores these values in memory registers during user entry of a denominator value, and, as explained hereafter, updates the value of input register 36 following entry of each denominator digit. In FIG. 5, a whole number register 70 having a mantissa field 70a and a sign field 70b stores in BCD format the digits entered prior to the first activation of the decimal point key 18. A numerator register 72 stores in BCD format the digits entered between the first activation and second activation of the decimal key 18. A denominator register 74 stores in BCD format the digit entered subsequent to the second activation of the decimal key 18, that is, digits entered during state 64 of FIG. 2.

Figure 6:
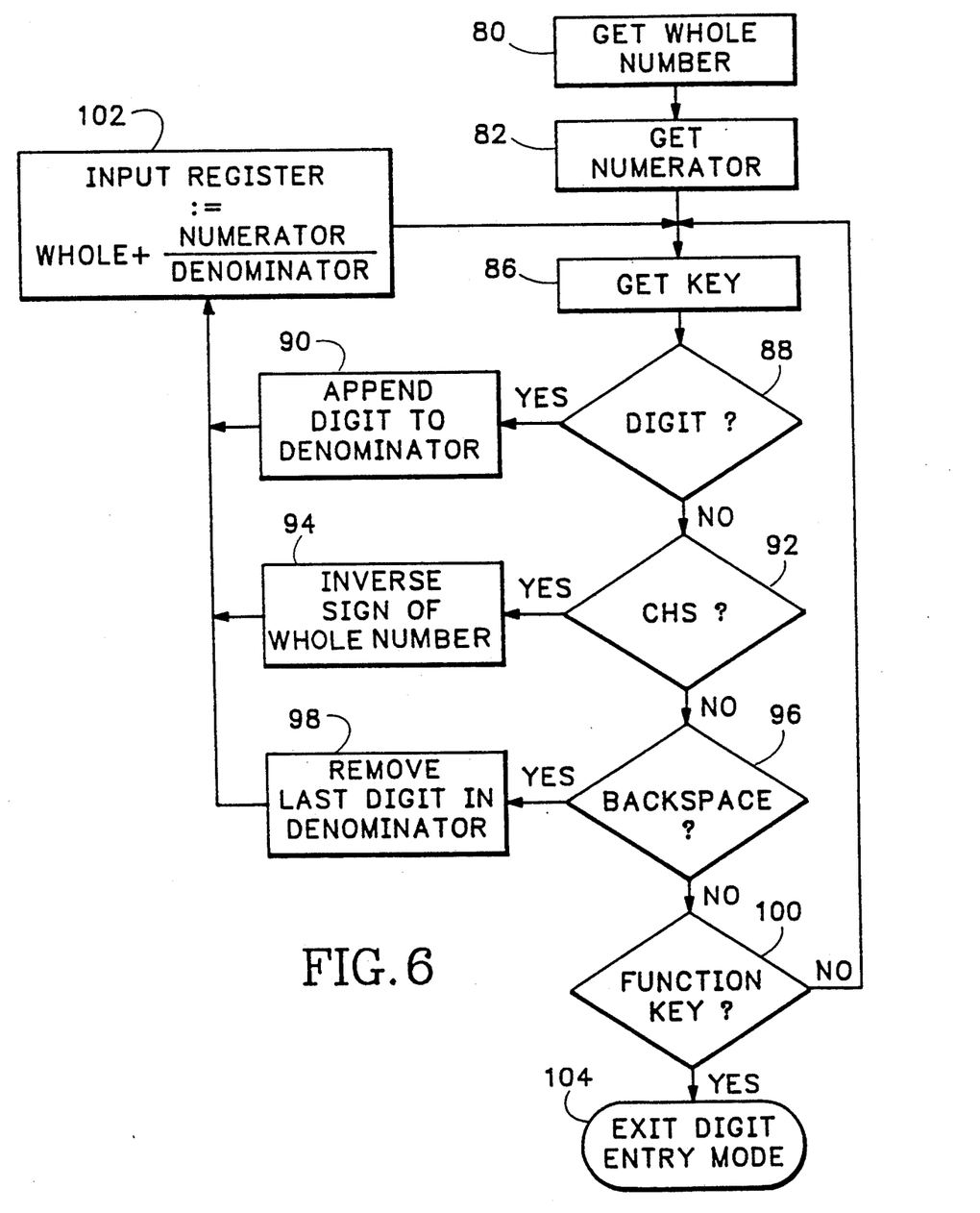
FIG. 6 is a flow chart illustrating processing steps associated with a digit entry mode state of FIG. 2.

FIG. 6 illustrates processing steps associated with state 64 of digit entry mode. In FIG. 6, processing begins in block 80 where calculator 10 extracts the whole number portion of input register 36, i.e., the digits entered prior to entry of the first decimal point and places these digits in field 70a of register 70. Sign field 36c of register 36 is then copied into field 70b of register 70. Processing then proceeds to block 82 where calculator 10 extracts the numerator portion of the value stored in input register 36, i.e., those digits entered after the first decimal point and prior to the second decimal point and places these digits in register 72.

Continuing to block 86, calculator 10 waits until the next key activation by the user. Following a key activation, in block 88 calculator 10 determines whether the key activated corresponds to one of digit keys 16. If the key activated was a digit key 16, then processing branches through block 90 where calculator 10 appends the corresponding digit to a denominator register 74 and proceeds to block 102. Calculator 10 then increments by one field 38h of register 38 to reflect the additional denominator digit. If the key activated was not a digit key 16, processing branches from block 88 to block 92 where calculator 10 determines whether the change sign key was activated. If the change sign key 20 was activated, processing branches from block 92 to block 94 where calculator 10 inverts the sign field 70b of the whole number register 70 and proceeds to block 102. If the key activated was not the change sign key 20, processing branches from block 92 to block 96 where calculator 10 determines whether the key activated was the backspace key 24. If the key activated was the backspace key 24, processing branches from block 96 to block 98 where calculator 10 removes the last digit in the denominator variable, decrements the field 38h and proceeds to block 102. If the key activated was not the backspace key 24, then processing branches from block 96 to block 100 where calculator 10 determines whether the key activated was a function key. If the key activated was not a function key, processing returns directly to block 86 with no action.

In block 102, calculator 10 calculates a value for input register 36 based on the contents of whole number register 70, the numerator register 72, and the denominator register 74. More particularly, in block 102 calculator 10 divides the numerator by the denominator, adds the whole number and places the result in input register 36. Processing then continues to block 86 for the next key activation. Calculator 10 thereby maintains a current value in input register 36 as an argument to an operation specified by a function key. Eventually, the user activates a function key and processing branches from block 100 to exit node 104 where calculator 10 exits digit entry mode and applies the contents of register 36 as a function argument.

Figure 7:
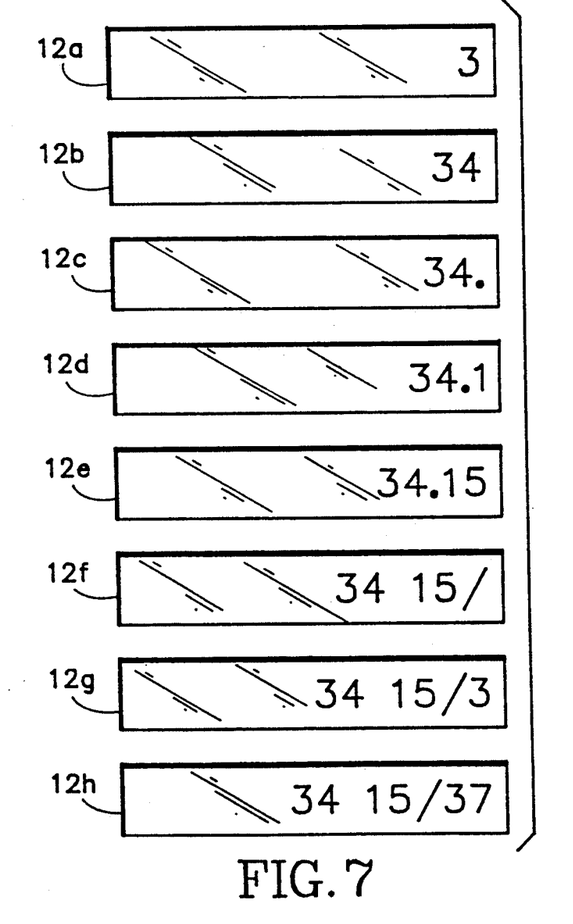
FIG. 7 illustrates the display panel of the calculator of FIG. 1 in successive stages of digit entry mode.

FIG. 7 illustrates a series of panel 12 displays corresponding to keystroke activation during entry of a fraction value. In FIG. 7 panels 12a–12h each correspond to displays appearing as a user enters a fraction value "34 and 15/37". Panel 12a shows the beginning of digit entry mode just after the user presses the number three digit key 16. The user then activates the number four digit key 16 and, as shown on panel 12b, the characters "34" appear. The user then presses the decimal point key 18 and, as shown on panel 12c, the characters "34.". appear. The user next activates the number one digit key 16 and the characters "34.1" appear, as shown on panel 12d. The user then activates the number five digit key 16 and, as shown on panel 12e, the character display "34.15" appears.

Up to this point, calculator 10 has monitored activation of each digit entry key and maintained a corresponding decimal value in input register 36. This processing corresponds to the states 40 and 52 of FIG. 2. The user next activates the decimal point key 18, for the second time during the current digit entry mode, and the character display "34 15/" of panel 12f appears. More particularly, upon the second activation of decimal point key 18, calculator 10 removes the decimal point character, i.e., that character corresponding to the first activation of decimal point key 18, and replaces it with a space character. Calculator 10 also appends a slash character to the end of the display sequence to indicate a separation between numerator and denominator.

The user then activates the number three digit key 16 and, as shown in panel 12g, the character sequence "34 15/3" appears. The user then activates the number seven digit key 16. As shown in display panel 12h, the character sequence "34 15/37" appears. At this point, calculator 10 is in block 86 of FIG. 6 where it awaits activation of the next key. The user has completed entry of the fraction value "34 and 15/37" and is ready to apply that value to a calculator function. As previously described, when the user activates a function key, processing branches from block 86 through blocks 88, 92, 96 and 100 to block 102 where a suitable decimal value corresponding to the fraction "34 and 15/37" is computed and placed in input register 36. Calculator 10 then applies that decimal value to the selected function in accordance with normal operating procedures.

A fraction value is thereby entered directly, i.e., without requiring the user to execute steps associated with calculation of a decimal value. This method of digit entry eliminates mental effort associated with user calculation of a decimal value. The user reads a fraction value directly from a formula, book, or such material, and enters the whole, numerator and denominator portions directly, as a single numeric value, rather than executing a sequence of mathematic operations.

As the user continues operation of calculator 10, calculation results are conventionally displayed as decimal values. However, it is desirable to display the results of such calculations in fraction form. Calculator 10 includes a display function for providing the user with calculation results in either decimal or fraction form. Fraction display mode key 120 (FIG. 1) toggles calculator 10 between decimal display mode and fraction display mode. Panel 12 can be provided with a display character indicating the current display mode, or the user can determine the current display mode by inspection.

Figure 8:
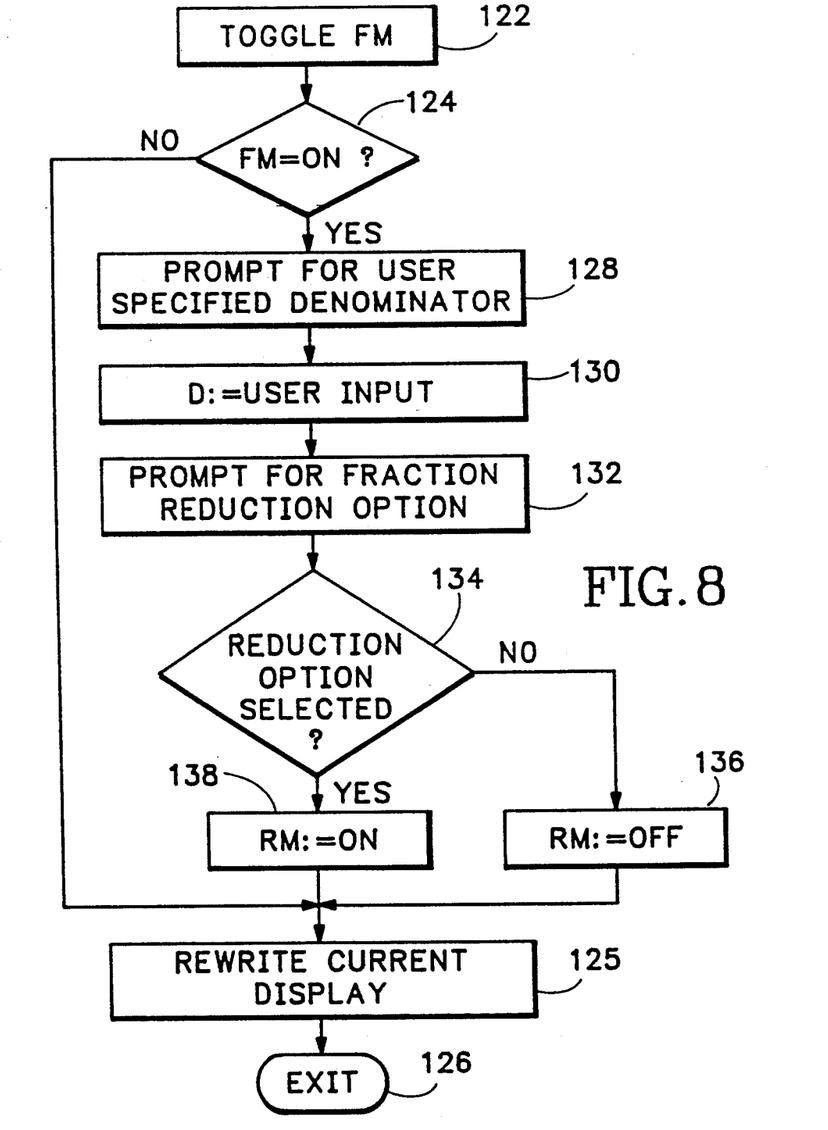
FIG. 8 is a flow chart illustrating processing steps associated with user activation of a fraction display mode key of the calculator of FIG. 1.

FIG. 8 illustrates processing steps associated with activation of key 120. In FIG. 8, upon activation of key 120, processing begins in block 122 where a global binary variable FM is toggled. Global variable FM, in an off state, indicates that values are to be displayed in decimal form, and in an on state indicates that values are to be displayed in fraction form. Processing then proceeds from block 122 to decision block 124 where calculator 10 tests the state of global variable FM. If the state of global variable FM indicates decimal mode, then processing branches directly from decision block 124 to block 125 where, as will be explained hereafter, the current panel 12 display is rewritten in accordance with the current display mode. Processing then continues to exit node 126.

If, however, global variable FM is set on, indicating fraction display mode, processing proceeds from decision block 124 to block 128. In block 128, calculator 10 prompts for a user specified denominator to be used in displaying numeric values on display panel 12. Processing proceeds to block 130 where the user provides a selected denominator value and that value is assigned to global variable D for subsequent use in displaying values in fraction form. The user may enter any arbitrary positive integer value as the display denominator, except, of course, those values exceeding machine limits. However, it may be desirable to limit the magnitude of the user selected denominator to reduce calculations regarding fraction reduction, discussed hereafter. Processing then continues to block 132 where the user may select a fraction reduction option. If the fraction reduction option is selected, calculator 10 reduces fraction displays to a smallest denominator. If the fraction reduction option is not selected, calculator 10 displays all fractions with the user specified denominator.

Processing advances from block 132 to decision block 134 to where the user response to the fraction reduction option prompt is evaluated. If the user does not select the fraction reduction option, processing branches from block 134 to block 136 where global variable RM is set to an off state. If the user does select the fraction reduction option, processing branches from decision block 134 to block 138 where global variable RM is set to an on state. Processing proceeds from each of blocks 136 and 138 to block 125 where panel 12 is rewritten in accordance with the current display mode, and then to exit node 126. Thus, upon activation of key 120, global variables FM, D and RM are set to indicate whether the user desires fraction display mode, and also whether the user desires reduction of fractions displayed.

Figure 9:
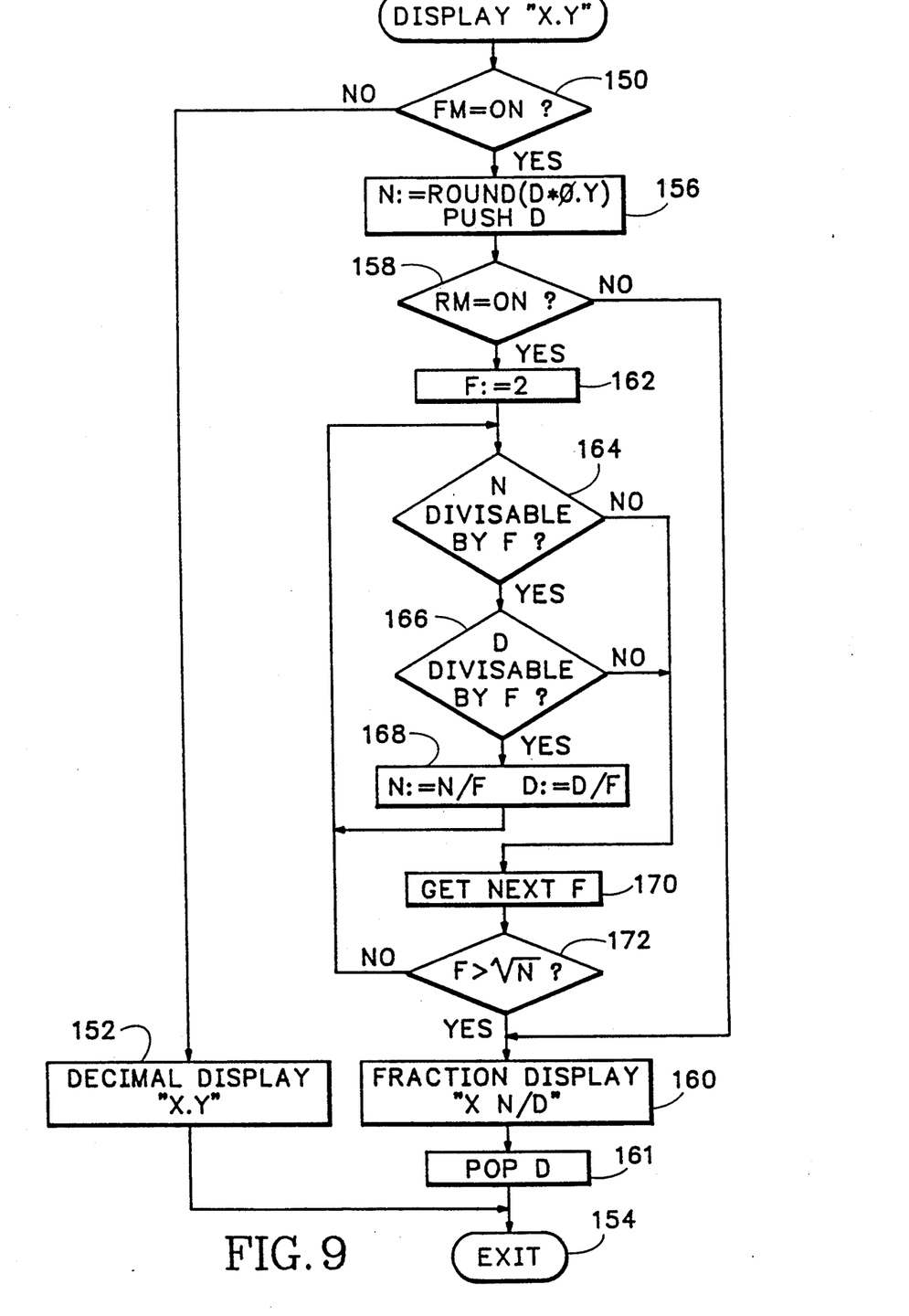
FIG. 9 is a flow chart illustrating processing steps associated with display of numeric values on the display panel of the calculator of FIG. 1.

FIG. 9 illustrates processing steps associated with displaying values on display panel 12 of calculator 10. Such processing is invoked in block 125 of FIG. 8 or anytime, other than during digit entry mode, a value is to be displayed on panel 12. More particularly, FIG. 9 illustrates the steps associated with evaluation of global variables FM, D and RM, and those steps associated with reduction of a fraction for display.

In FIG. 9, a decimal numeric value "X.Y" is to be displayed, where "X" corresponds to a whole integer portion and "Y" corresponds to a partial integer portion. Processing begins in decision block 150 where calculator 10 tests the value of global variable FM. If global variable FM is set to its off state, processing branches directly to block 152 where characters corresponding to the numeric value "X.Y" are displayed in conventional decimal form. Processing then continues to exit node 154.

If global variable FM is set to an on state, processing branches from block 150 to block 156 where a local variable N receives a value based on the product of the user specified denominator, as represented by the global variable D, and the partial integer portion Y. The product is rounded to the nearest integer and stored in the variable N as a numerator value for display. Also in block 156, the value of variable D is pushed onto a memory stack to preserve its global value in the event that fraction reduction occurs. Processing continues to block 158 where the global variable RM is evaluated.

If the global variable RM is set to its off state, indicating no fraction reduction, processing branches to block 160 where a fraction display procedure presents on panel 12 the value of X as the whole integer, a space character, the calculated integer value N, a slash character, and the user specified denominator as represented by the variable D. Processing continues from block 160 to block 161, where the global value of variable D is recovered from the memory stack by a pop command, and then to exit node 154.

If the global variable RM is set to its on state, indicating fraction reduction, processing branches from decision block 158 to block 162. In block 162, a local variable F is assigned a value of two as a first proposed common factor of the current values for variables N and D. Then in block 164, calculator 10 determines if the value stored in the variable N is evenly divisible by the value stored in the variable F. If the value stored in the variable N is evenly divisible by the value stored in the variable F, processing branches from block 164 to block 166 where a similar test is performed with respect to the value stored in the variable D. More particularly, in block 166 calculator 10 determines whether the value stored in the variable D is evenly divisible by the value stored in the variable F. If the value stored in the variable D is divisible by the value stored in the variable F, processing branches from block 166 to block 168 where new values are calculated for the variables N and D. In calculating new values for the variables N and D, the variable N takes the current value of N divided by the value of the variable F and the variable D takes the current value of the variable D divided by the value of the variable F. Processing then returns to block 164 to determine whether the current values for variables N and D remain divisible by the value of the variable F.

When, in blocks 164 and 166, it is determined that one of the values stored in the variables N and D, respectively, are not divisible by the value of the variable F, processing branches from one of blocks 164 and 166, respectively, to block 170. In block 170, calculator 10 invokes a get next F function which returns a next proposed common factor for the values stored in variables N and D. The function invoked in block 170 may take several forms. It could simply return the next integer value following the value stored in the variable F. This method requires little calculation in producing a next proposed factor, however, it is likely to return many unsuccessful candidates. This is to say, it returns many proposed factors which cannot be a common factor of both values stored in the variables N and D. The function invoked in block 170 could return a sequence of prime numbers. However, generating a large list of prime numbers is computationally expensive, and it is not feasible to store such a list, even though such factors would be more likely to be successful candidates as common denominators of both the values stored in the variables N and D. The function invoked in block 170 could, after returning the initial value of two, simply return odd numbers beginning with the number three. Other methods of generating proposed factors are known for fraction reduction algorithms. The method of returning odd numbers beginning with the value three, however, is generally considered an acceptable approach.

Processing proceeds from block 170 to decision block 172 where the value of variable F is tested relative to the value of the variable N to determine whether additional proposed common factors are necessary. More particularly, when the value of the variable F exceeds the square root of the value of the variable N, no further common factors will be found. If no further proposed factors are required, processing branches from block 172 to display block 160 where, as described above, the whole portion is presented in conjunction with the current values for the variables N and D as a fraction value. Following block 160, in block 161 calculator 10 pops the variable D to recover its global value and proceeds to exit node 154.

If additional proposed factors are necessary, processing branches from block 172 to block 164 and proceeds as described above.

Thus, a calculator having fraction entry and display has been shown and described. The calculator accepts directly fractions as input requiring the user to execute mathematic operations. Such fraction entry permits the user to apply fraction values, for example, as taken from a text book, as input to the calculator in a form corresponding to the form the user is familiar with. The calculator displays calculation results as fractions having a user selectable denominator. The user is presented with familiar calculation results and need not convert such results, i.e., to a recognizable denominator, for proper interpretation.

While a preferred embodiment of the present invention has been shown and described, it will be apparent to those skilled in the art that many changes and modifications may be made without departing from the invention in its broader aspects. For example, while the present invention has been shown and described in connection with a reverse polish calculator, it should be apparent that the present invention is applicable to algebraic calculators. Also, while the invention has been shown for entry of fraction values, it will be understood that the present invention is applicable to entry of any multiple-field value. Such applications include entry of angles represented by data fields holding degree, minute, and second values where entry of each field is separated by, for example, activation of the decimal point key; entry of a time value represented by data fields holding hour, minute, and second values; and entry of a length value represented by data fields holding feet, inches, and portions of inches. The appended claims are therefore intended to cover all such changes and modifications as fall within the true spirit and scope of the invention.

I claim:

1. A calculator for operation by a user, the calculator comprising:
   a plurality of digit entry keys for activation by the user to input a numeric value, one of said digit entry keys being a primary key;
   a display;
   means for presenting characters on said display corresponding to user activation of said digit entry keys whereby upon a first activation of said primary key a character corresponding to a decimal point is presented on said display, and upon a second activation of said primary key said character corresponding to a decimal point is removed from said display and a numerator-denominator separation character is presented on said display;
   register means for storing a numeric value;
   means for receiving a user selected denominator;
   calculation means for deriving a whole value and a numerator value using said selected denominator value and said numeric value to represent said numeric value as a fraction value; and
   means for presenting said whole value, numerator value, and denominator value as said fraction value on said display.

2. The calculator according to claim 1 wherein said character corresponding to a decimal point is a decimal point character.

3. The calculator according to claim 1 wherein upon removal from said display of said character corresponding to a decimal point character, said character corresponding to a decimal point character is replaced on said display by a space character.

4. A method of entering numeric values into a calculator by way of a plurality of digit entry keys including a primary key, the method comprising the steps:
   processing activation of digit entry keys up to and following a first activation of said primary key as representative of a decimal value; and
   processing activation of said digit entry keys subsequent to a second activation of said primary key, as a denominator value for a fraction having a whole number portion corresponding to digit entry keys activated prior to the first activation of the primary key and a numerator number portion corresponding to digit entry keys activated subsequent to the first activation of the primary key but prior to the second activation of the primary key.

5. The method according to claim 4 wherein the primary key is a decimal point key and the method further comprises the steps:
   presenting on a display of the calculator a first set of characters corresponding to digit entry keys activated prior to the first activation of the decimal point key, a second set of characters corresponding to digit entry keys activated subsequent to the first activation of the decimal point key, and a decimal point character separating the first and second sets of characters; and
   replacing the decimal point character with a space character upon the second activation of the decimal point key and presenting on the display a third set of characters corresponding to digit entry keys activated subsequent to the second activation of the decimal point key and a slash character separating the second and third sets of characters.

6. The method according to claim 4 further comprising the steps of converting said fraction to an input decimal value upon user activation of a function key and applying said input decimal value to a function corresponding to the activated function key.

7. A calculator for operation by a user, the calculator comprising:
   a plurality of digit entry keys for activation by a user to input a numeric value, one of said digit entry keys being a primary key;
   a display;
   means for presenting characters on said display corresponding to user activation of said digit entry keys whereby upon a first activation of said primary key a character corresponding to a decimal point is presented on said display, and upon a second activation of said primary key said character corresponding to decimal point is removed from said display and a numerator-denominator separation character is presented on said display.

8. The calculator according to claim 7 wherein said primary key is a decimal point key, and said character corresponding to a decimal point is a decimal point character.

9. The calculator according to claim 7 wherein said numerator-denominator separation character is a slash character.

10. In a calculator that includes numeric keys and a decimal point key used for decimal entry, a method of entering and displaying numbers including fractions comprising the steps:
    entering on the numeric keys a whole number;
    activating the decimal point key;
    entering on the numeric keys a numerator portion of a fraction;
    activating the decimal point key;
    displaying, in response to the second activation of the decimal point key, the whole number separate from the numerator with a slash character appended to the numerator;
    entering on the numeric keys a denominator portion of a fraction; and
    displaying the denominator adjacent to the slash character to complete the fraction.

* * * * *